Patented Mar. 27, 1951

2,546,788

UNITED STATES PATENT OFFICE 2,546,788

PRODUCTION OF 7-DEHYDROSTEROLS

Kurt H. Schaaf, Jamaica, N. Y., assignor to Nopco Chemical Company, Harrison, N. J., a corporation of New Jersey No Drawing. Application May 14, 1949, Serial No. 93,409

17 Claims. (Cl. 260—397.2)

This invention relates to a new dehydrohalogenation process and more particularly to a highly improved process for producing 7-dehydrosterols.

Since the discovery by Ziegler (Annalen 551, 80–119) that the halogenation of organic compounds at a carbon atom alpha to a double bond could be accomplished by using compounds such as N-halogenated acid amides and imides as halogenating agents, a great deal of research has been carried out on the application of this reaction to the production of 7-dehydro derivatives of various sterol compounds. The greater part of this work has been directed to the production of 7-dehydrocholesterol. As is well known, 7-dehydrocholesterol is readily converted to vimain $D_3$ by irradiation with ultra-violet light. In order to form 7-dehydrocholesterol from the halogenated cholesterol compounds produced in accordance with the Ziegler process, it is necessary to subject the halogenated sterol compounds to dehydrohalogenation with a suitable dehydrohalogenating agent. The compounds which have been most frequently employed to react with the halogenated sterol derivatives to effect dehydrohalogenation are compounds such as dimethylaniline, diethylaniline, collidine and quinoline. Compounds such as triethyl amine, N,N-dipropylaniline, N-ethyl-piperidine and N,N-diethyl-cyclohexyl amine have also been employed for this purpose. Of these many prior art dehydrohalogenating agents, it has been my experience that diethylaniline has been by far the most satisfactory and has given the highest yields and the highest purity as compared to any of the other compounds above mentioned. In British Patent No. 574,432, the results which are set forth therein appear to indicate the same result, i. e. that diethylaniline is by far the most satisfactory dehydrohalogenating agent so far known. Although diethylaniline has proved to be fairly successful in the prior art as a dehydrohalogenating agent, the yields of 7-dehydro compounds which are obtained even when it is employed as the dehydrohalogenating agent are not as high as desired. Furthermore, the purity of the products which are obtained in accordance with the prior art methods is often not as high as desired.

It is the object of this invention to provide a new and highly improved process for producing 7-dehydrosterols.

A further object of the invention is to provide a new and highly improved process for dehydrohalogenating halogenated sterol compounds which will give much higher yields than the prior art methods for dehydrohalogenation and which higher yields will be of products having a purity higher than the products obtained by the prior art dehydrohalogenation processes.

Other objects of the invention will in part be obvious and will in part appear hereinafter.

I have discovered that the above and other objects of the invention may be realized if the dehydrohalogenation of a halogenated sterol compound is effected by reacting the halogenated sterol compound with quinaldine in the presence of an aromatic hydrocarbon solvent. The yields of the desired 7-dehydrosterol compounds which are obtained are substantially higher when the dehydrohalogenation is effected in this manner than when the dehydrohalogenation is carried out in accordance with the disclosures of the prior art. Furthermore, the products which are obtained in these substantially higher yields are often of considerably higher purity than the products which are obtained when the dehydrohalogenation is carried out in accordance with the methods of the prior art.

As I have stated above, it is possible to obtain much higher yields of the desired 7-dehydrosterol compound by effecting the dehydrohalogenation of the halogenated sterol compound by reacting the halogenated sterol compound with quinaldine in the presence of an aromatic hydrocarbon solvent. As will appear from the various specific examples given hereinafter, the yields obtained in this manner are often well over 100% greater than the yields obtained when the dehydrohalogenation is carried out in accordance with the prior art methods. When dehydrohalogenation is effected with diethylaniline (one of the prior art dehydrohalogenating agents) in the presence of an aromatic hydrocarbon solvent, the yields which are obtained are no greater and in some cases are even less than the yields obtained with diethylaniline in the absence of such a solvent. Undoubtedly this is the reason why it is recommended in U. S. Patent No. 2,441,091 that dehydrohalogenation should be carried out in a solvent-free medium. In addition to the much higher yields of the desired products which are obtained with my novel process as compared to the prior art methods, the purity of the products which are obtained by my process is in nearly all cases higher than the purity of the products resulting from the prior art processes.

The amount of quinaldine which is employed in the reaction should be sufficient, of course, to react completely with the halogenated sterol compound which is to be dehydrohalogenated, i. e. at least a mole to mole ratio should be employed. As a matter of convenience, it is usually preferred to use an excess of quinaldine over the amount theoretically required to bring about the dehydrohalogenation reaction. Thus from about three moles to about six moles of quinaldine per mole of halogenated sterol compound are conveniently employed. Larger amounts of quinaldine per mole of halogenated sterol compound may be employed, if desired, but the use of such larger amounts is not necessary. In order to obtain the most consistent results, it is preferred that quinaldine in a fairly high state of purity be used. Commercial quinaldine can be purified by fractional distillation or quinaldine can be synthesized by a modified Skraup synthesis. In both cases the quinaldine is of a suitable state of purity and will consistently give excellent results when employed to bring about the dehydrohalogenation of a halogenated sterol compound. If desired, however, quinaldine containing rather high percentages of impurities can be employed successfully in the process of the invention. As will appear from certain of the specific examples given hereinafter, quinaldine containing as much as 10% and more of impurities can be used successfully to effect the dehydrohalogenation of the halogenated sterol compounds without appreciably decreasing the yields of the desired 7-dehydrosterol compounds.

The process of the present invention is carried out in an aromatic hydrocarbon solvent solution of the halogenated sterol derivative and the quinaldine. Among the many such hydrocarbon solvents which are suitable for use in my novel process there may be mentioned benzene, toluene, xylene, methyl isopropyl benzene, isopropyl benzene, ethyl benzene, diethyl benzene, mesitylene, butyl benzene, amyl benzene, etc. The amount of such a solvent which is employed preferably should be at least about equal to the volume of the halogenated sterol derivative and the quinaldine. It appears that the most satisfactory results are obtained when the volume of the solvent which is employed is from about 5 to 15 times as great as the volume of the quinaldine which is employed. If desired, ratios of solvent to quinaldine greater than 15 to 1 may be employed although such higher ratios are not necessary.

In carrying out the process of the invention, it is necessary to heat the mixture of quinaldine, solvent, and halogenated sterol compound in order to bring about the dehydrohalogenation reaction. In most cases, it is preferred to heat the reaction mixture at the reflux temperature of the aromatic solvent. The most efficient results and the highest yields are obtained when the reaction is carried out at a temperature between about 80° C. and about 150° C. although temperatures higher than 150° C. can be employed if desired. The length of time which it is necessary to heat the reaction mixture will vary slightly depending upon the temperature at which the reaction is carried out with the longest periods of heating being required at the lower temperatures. I have found that excellent yields of the desired 7-dehydro compound may be obtained in some cases after periods of heating as short as one-quarter of an hour, e. g. when xylene is the aromatic solvent and the reaction is carried out at the reflux temperature of the solvent, although in other cases, e. g. when toluene is the aromatic solvent, it appears to be desirable to heat the reaction mixture at the reflux temperature of the solvent for at least one-half an hour. In all cases, excellent yields of the desired compounds will be obtained.

After the dehydrohalogenation reaction has been accomplished, the desired 7-dehydrosterol can be recovered from the dehydrohalogenation reaction mixture in any convenient manner. The exact method employed for isolating the 7-dehydrosterol compound will depend to some extent upon the specific derivative of the sterol employed as the starting material in the process. It is quite well known that a sterol compound prior to being subjected to halogenation in accordance with the Ziegler process must be treated in some manner or other so as to convert the hydroxyl group on the 3 position to a group which will not be detrimentally affected by the halogenating agent but which can conveniently be reconverted to a hydroxyl group. Thus the hydroxyl group may be converted to an ester group or to an ether group or it may be replaced with any other suitable inactive group which may later be split off with re-formation of the hydroxyl group at the 3 position. The most common practice in the prior art and what appears to be the most suitable and most feasible practice is to convert the hydroxyl group to an ester group by esterification with an efficient esterifying agent such as acetic anhydride, benzoyl chloride, or the like. If the sterol compound has been converted to an ester thereof, the sterol is re-formed by a simple hydrolysis of the ester group by saponification with alcoholic alkali. The practice in the prior art as shown by the British patent referred to hereinabove and by U. S. Patent No. 2,441,091 and its French counterpart, French Patent No. 901,551, has been to remove the dehydrohalogenating agent from the reaction mixture prior to carrying out the saponification of the ester of the sterol compound. This is accomplished according to these prior art patents either by a process involving admixing the reaction mixture with an excess of an aqueous acid solution and extracting this mixture with a solvent such as ether or a hydrocarbon solvent to remove the 7-hydrosterol ester from the aqueous mixture or it is accomplished by a process involving dissolving the dehydrohalogenation reaction mixture in an excess of a water immiscible solvent such as petroleum ether and then extracting that solvent solution with an aqueous acid solution to remove the dehydrohalogenating agent from the solvent solution. In either case the solvent solution containing the 7-dehydrosterol ester is then washed with a dilute alkali solution to remove any acid dissolved in the solvent and thereafter the solvent solution is washed with water to remove any alkali dissolved in the solvent. Thereafter, the solvent is generally evaporated to recover the 7-dehydrosterol ester since the solvent which has been used in separating the ester from the dehydrohalogenation reaction mixture is generally a solvent which is not well suited as a vehicle in which to carry out the saponification of the ester to form the free sterol. After the ester has been isolated it is then hydrolyzed with an alcoholic alkali solution. In certain of the specific examples given hereinafter, the general procedure of the prior art is employed to separate the crude 7-dehydrosterol esters from the dehydrohalogenation reaction mixture prior to saponification of the esters.

In these particular experiments it was desired to separate the crude 7-dehydrosterol esters from the dehydrohalogenation mixtures prior to carrying out the saponification reaction. In commercial practice, however, it is preferable to carry out the saponification of the esters in accordance with the new and highly improved process which is disclosed and claimed in my copending U. S. Patent Application Serial No. 781,497 filed on October 22, 1947. The details of this process are set forth herein in Examples X and XI. This process eliminates entirely the separation of the 7-dehydrosterol ester from the dehydrohalogenating agent prior to effecting the saponification of the ester. Instead the saponification is carried out directly in the reaction mixture obtained from the dehydrohalogenation reaction by dissolving the dehydrohalogenation reaction mixture in an excess of an alcoholic alkali solution wherein the alcohol is one containing not more than 4 carbon atoms, saponifying the 7-dehydrosterol ester in the resulting mixture, and cooling the mixture to a temperature somewhat below room temperature whereupon the free 7-dehydrosterol crystallizes from the solution in a relatively high state of purity. Any other suitable means of carrying out the saponification of the 7-dehydrosterol ester can, of course, be employed.

As mentioned above, it is common practice to block the hydroxyl group on the 3-position of the sterol compounds during the halogenation reaction by converting the hydroxyl group to a group which will not react with the dehydrohalogenating agent but which may later be reconverted to the hydroxyl group. For convenience, the term "inactive group" will be used herein in referring to such a group. For the purposes of the present invention, it is, of course, entirely immaterial just what inactive group is used to protect the 3-position of the sterol compound since the reaction between the halogenated sterol compound and the quinaldine involves, of course, the removal of the halogen atom from the 7 position on the sterol compound and the removal of the hydrogen atom from the 8 position of the sterol compound.

The specific examples given hereinafter show the use of the halogenated acetate and benzoate esters of chloesterol in the process of the invention. These examples are only illustrative and the reaction which takes place between these halogenated esters and quinaldine takes place with equal efficiency and ease between quinaldine and any other sterol compound having a double bond between the 5 and 6 carbon atoms and a halogen atom on the 7 carbon atom. Thus the process of my invention is quite suitable for and is very effective in dehydrohalogenating any sterol compounds of this nature regardless of whether they are the esters, the ethers of any other suitable derivatives of the particular sterol compound being dehydrohalogenated. Furthermore as far as the esters are concerned, any of the various sterol esters which may be formed can be dehydrohalogenated by the process of my invention. Among the sterol esters which have been utilized in the prior art patents and which are quite suitable for use in the process of my invention, there may be mentioned the propionate, the butyrate, the oxalate, the formate, and the stearate esters of the halogenated sterol compounds as well as the acetate and benzoate esters thereof.

For a fuller understanding of the nature and objects of the invention, reference may be had to the following examples which are given merely as further illustrations of the invention and are not to be construed in a limiting sense:

*Example I*

A mixture of 10.0 gms. of crude 7-bromocholesteryl benzoate and 15 mls. of diethylaniline (one of the prior art dehydrohalogenating agents) was heated on an oil bath for 3 hours at 95° C. with stirring in the presence of a nitrogen atmosphere. The reaction mixture was cooled, taken up in 75 mls. of 5% hydrochloric acid and extracted twice with 50 ml. portions of benzene. The benzene extracts were washed to neutrality with three 25 ml. portions of water. To the benzene solution there was added a solution of 2.0 gms. of 86% KOH pellets in 40 mls. of ethanol. The mixture was refluxed for one-half hour in the presence of nitrogen to hydrolyze the 7-dehydrocholesteryl benzoate to 7-dehydrocholesterol. The cooled reaction mixture was poured into 150 mls. of water and the resulting mixture was extracted with four 50 ml. portions of ether. The ether extracts were washed with three 50 ml. portions of a 10% salt solution, then dried over sodium sulphate and thereafter the solvent was removed in vacuo. A light tan solid weighing 7.05 gms. was obtained. A spectroscopic analysis of this material showed that the product had a purity of 26.2%, thus giving a yield of 7-dehydrocholesterol based on the amount of 7-bromocholesteryl benzoate employed of only 27.4%.

*Example II*

To a boiling hot mixture of 15 ml. of quinaldine and 50 ml. of toluene was added a solution made up of 25 ml. of toluene containing 10 gms. of the same crude 7-bromocholesteryl benzoate employed in Example I. The mixture was refluxed for 2 hours in an atmosphere of nitrogen. At the end of the reaction, the mixture was chilled and filtered with suction to remove the quinaldine hydrobromide which was then washed with a small amount of ether. The combined ether-toluene filtrate was washed once with 75 ml. of 5% hydrochloric acid. The aqueous acid phase was then extracted twice with 50 ml. each of ether. The combined ether-toluene filtrate and washings were washed with two 50 ml. portions of water, and the solvent was evaporated under vacuum. The residue was dissolved in 100 ml. of benzene and the crude 7-dehydrocholesteryl benzoate was then hydrolyzed and the 7-dehydrocholesterol recovered as described in the previous example. A creamy solid weighing 6.61 gms. was obtained. Spectroscopic analysis of the product showed a purity of 63.4%, thus giving a total yield of the desired product of 62.1%. Thus it is seen that based upon the purity of the product obtained in accordance with the prior art process, the purity of the product of the present example was over 140% greater than the purity of the product obtained when diethylaniline was employed as the dehydrohalogenating agent. Likewise, the total yield of the desired product in this example was over 125% greater than the total yield obtained with diethylaniline.

*Example III*

In order to determine if diethylaniline would give any better results by reacting it with the 7-bromocholesteryl benzoate in the presence of an aromatic hydrocarbon solvent, another experiment was carried out in essentially the same manner as Example II except that the quinaldine was replaced with diethylaniline. The product which was recovered was a light orange, sticky resin, weighing 6.58 gms. On spectroscopic analysis it was found to have a purity of only 24.9% thus giving a total yield of 7-dehydrocholesterol of only 24.3%. Comparing this experiment with that of Example I, it is seen that the toluene instead of causing the diethylaniline to give improved yields, caused the yield of 7-dehydrocholesterol produced to drop by about 11%. Thus it appears that the combination of an aromatic hydrocarbon solvent and diethylaniline is not as effective a dehydrohalogenating agent as is diethylaniline alone.

Example IV

Another experiment was carried out in a manner similar to that employed in Example II. In this experiment a hot solution of 10 gms. of crude 7-bromocholesteryl benzoate in toluene was added to a hot mixture of 15 ml. of quinaldine in toluene. The total amount of toluene which was employed was 75 mls. The mixture was heated at the reflux temperature of the toluene for ½ hour. The 7-dehydrocholesterol was isolated from the ester thereof as in the previous examples and recovered in the same manner as before. The yield obtained amounted to 7.07 gms. of a yellow solid which on spectroscopic analysis was found to have a purity of 55% thus giving a total yield of 7-dehydrocholesterol of 57.6%.

Example V

In this experiment, crude 7-bromocholesteryl benzoate was dehydrohalogenated with quinaldine in the presence of benzene. The amounts of the reagents were the same as in the previous examples. The reagents in this experiment were admixed at room temperature as in Example I. The mixture was heated under reflux for 4½ hours on a steam bath. The 7-dehydrosterol ester was hydrolyzed and the free 7-dehydrosterol recovered as in the previous examples. A yield of 7.25 gms. of a pale tan solid was obtained. This product on spectroscopic analysis was found to have a purity of 53.8% thus giving a yield of 57.8% of 7-dehydrocholesterol.

Example VI

In this experiment the reaction of crude 7-bromocholesteryl benzoate with quinaldine was carried out in the presence of xylene. The reagents were used in the same amounts and were admixed in the same manner as in Example IV and the reaction was carried out at the reflux temperature of the xylene for 2 hours. The crude 7-dehydrocholesterol which was obtained amounted to 6.60 gms. of a light orange-yellow solid having a purity of 57.4% thus giving a yield of 56.1%.

Example VII

In this experiment the procedure of Example VI was followed in all respects except that the reaction period instead of being 2 hours as in Example VI was reduced to 15 minutes. The product which was obtained was in all respects essentially the same as that obtained in Example VI. A light orange-yellow solid weighing 6.54 gms. was obtained. It had a purity of 56.8% thus giving a yield of 7-dehydrocholesterol of 55.0%. It is apparent therefore that it is unnecessary to heat the reagents for more than about 15 minutes in order to obtain substantially complete reaction when the reaction is carried out in a xylene solution. It is also apparent that periods of heating substantially in excess of 15 minutes appear to have no detrimental effects when the reaction is carried out with quinaldine in the presence of xylene at the reflux temperature of the xylene.

Example VIII

Another experiment was carried out wherein 10 gms. of crude 7-bromocholesteryl benzoate was reacted with quinaldine in the presence of toluene. In this experiment 30 mls. of quinaldine were employed instead of 15 mls. as in the previous experiments, and 150 mls. of toluene were employed instead of 75 mls. of solvent as in the previous examples. The reagents were mixed together at an elevated temperature as in Example IV and were then heated for 2 hours at the reflux temperature of the solvent. A creamy solid amounting to 6.76 gms. was recovered by the same procedure which was employed in the previous examples to isolate the 7-dehydrocholesterol. The product had a purity of 61.9% thus giving a total yield of 7-dehydrocholesterol of 61.9%.

Example IX

In this experiment 10 gms. of the same crude 7-bromocholesteryl benzoate as was employed in Example I were reacted with 15 mls. of quinaldine in the presence of 300 mls. of xylene. The reagents were mixed together at room temperature and then heated for 2 hours at the reflux temperature of the xylene. The 7-dehydrocholesterol was isolated in the same manner as in the previous examples and amounted to 7.81 gms. of a light tan solid having a purity of 63.6% thus giving a yield of 7-dehydrocholesterol of 73.5%. From the results of this experiment it is apparent that a rather large excess of the aromatic hydrocarbon solvent appears to have a substantial beneficial effect in increasing the total yield of 7-dehydrosterol. It is seen that the yield in this example was from about 270% to about 300% of the yields obtained in experiments I and III in which diethylaniline was employed to react with the halogenated cholesterol esters in order to effect the dehydrohalogenation reaction. Furthermore the purity of the crude product which was obtained in the present example was about two and a half times as great as that of the products obtained in those experiments in which diethylaniline was employed to effect the dehydrohalogenation.

Example X

To a boiling hot solution of 2000 gms. of recrystallized cholesteryl acetate in 8 liters of anhydrous hexane there were added 9.30 gms. of lauroyl peroxide and 1040 gms. of powdered, crude 96.05% N-bromosuccinimide. The halogenation reaction took place over a period of 13 minutes after which the reaction mixture was cooled to about 55° C. and filtered with suction. The succinimide which was filtered off was washed twice with 500 ml. portions of hexane. The filtrate and washings were combined and 3 liters of dried diethylaniline (one of the prior art dehydrohalogenating agents) added thereto, yielding a mixture weighing 10,821 gms.

971 gms. of the mixture were heated in a waterbath in vacuo ($N_2$ atm.) to distill off the hexane. The residual diethylaniline solution thus obtained was heated at 90° C.–91° C. at 40 mm. pressure for 3 hours with stirring ($N_2$ atm.). To the reaction mixture there was then added a hot solution of 79.4 gms. of 87% KOH pellets in 825 ml. of ethyl alcohol and the mixture refluxed in a water bath for one-half hour with stirring (N₂ atm.). The reaction mixture was then chilled to +4° C. with stirring to crystallize the 7-dehydrocholesterol. Then 120 ml. of water were slowly added and the mixture stored at +2° C. overnight.

The solids were filtered off at room temperature and washed first with four 150 ml. portions of water and then with two 100 ml. portions of ice-cold 85% ethanol. The crude, crystalline 7-dehydrocholesterol was dried at 105° F. in a vacuum drier and yielded 99.9 gms. of a dark-cream, crystalline solid.

From a spectroscopic analysis the following results were obtained:

54.4% purity
30.25% overall yield from cholesteryl acetate.

*Example XI*

To a boiling hot solution of 200.0 gms. of recrystallized cholesteryl acetate in 800 ml. of anhydrous hexane were added 102.0 gms. of powdered, recrystallized 97.4% N-bromosuccinimide and 0.930 gms. of lauroyl peroxide. The bromination was conducted as in Example X, and the reaction mixture was then filtered to remove the succinimide. The hexane of the filtrate was evaporated in a water-bath (55° C.) in vacuo (N₂ atm.). The amber residue was dissolved in 250 ml. of anhydrous toluene, and the solvent was evaporated as above to flush out any residual hexane. The residue was then dissolved in 1500 ml. of toluene, and 300 ml. of quinaldine was added. The mixture was refluxed (N₂ atm.) for two hours with stirring, and the toluene was then evaporated in a water-bath (85° C.) in vacuo (N₂ atm.).

The remaining, dark-amber reaction mixture was refluxed (N₂ atm.) for ½ hour with a solution of 79.4 gms. of 86% KOH pellets in 825 ml. of ethyl alcohol. To the chilled mixture was added 120 ml. of water, and the resulting mixture was stored at −15° C.

The crude 7-dehydrocholesterol, which was isolated in the same manner as in Example X, amounted to 130.7 gms. of a light-tan solid. A spectroscopic analysis of this product gave the following results:

66.6% purity
48.5% overall yield from cholesteryl acetate.

*Example XII*

To determine the effect of the purity of the quinaldine upon the yield of 7-dehydrosterol which could be obtained, a number of experiments were carried out using samples of quinaldine containing varying percentages of impurities. In the first experiment the quinaldine which was employed contained 2.5% of the impurities found in the crude commercial quinaldine. In the other experiments the quinaldine which was employed contained 5%, 10% and 12.5% respectively of the impurities found in the crude commercial quinaldine. All of the experiments were carried out in the same general manner as the experiment described in Example VII hereinabove. The purities of the 7-dehydrocholesterol obtained in these four experiments were 59.7%, 56.4%, 55.7%, and 52.0% respectively; and the yields of 7-dehydrocholesterol which were obtained were 61.1%, 56.5%, 57.0% and 50.6%. Thus it is seen that although the purity and yield of the products obtained are slightly higher when the quinaldine contains only a small percentage of impurities as compared to when it contains a relatively large percentage of impurities, very excellent yields of a product having a relatively high degree of purity are obtained even when the quinaldine does contain a relatively large percentage of impurities.

From the illustrative examples and the general description of the invention given hereinabove, it is quite apparent that the process of my invention gives far greater yields of the desired 7-dehydrosterols than can be obtained when operating in accordance with the prior art methods. Furthermore the products which are obtained by the process of my invention often have a much greater purity than the products obtained by the prior art methods. Although the detailed examples given hereinabove have dealt with the treatment of esters of cholesterol, the process of my invention can be applied to the treatment of any esters of any similar sterol or to any other sterol derivative in which the 3 position is protected by some inactive group on the 3 position other than an ester group such as, for example, an ether group. The particular inactive group which is at the 3 position to protect that position from attack throughout the process of converting the sterol to a 7-dehydrosterol is entirely unimportant as far as the process of my invention is concerned inasmuch as the particular group which is on the 3 position in no way enters into the reaction which occurs between the halogenated sterol compound and quinaldine. Consequently the process of my invention is applicable to the dehydrohalogenation of any sterol derivative having a double bond between the 5 and 6 carbon atoms and having a halogen atom on the 7 carbon atom.

The process of halogenating a sterol derivative with a compound such as N-bromosuccinimide in the presence of an organic peroxide, which process was employed in Examples X and XI to prepare the halogenated sterol derivatives, is disclosed and claimed in copending U. S. Patent Application Serial No. 765,631 of William L. Ruigh filed on August 1, 1947.

Having described my invention, what I claim as new and desire to secure by Letters Patent is:

1. In a process for producing a 7-dehydrosterol, the step which comprises reacting quinaldine with a sterol derivative selected from the group consisting of sterol esters and sterol ethers which have a double bond between the 5 carbon atom and the 6 carbon atom and which has a halogen atom attached to the 7 carbon atom with the reaction of the quinaldine with the halogenated sterol derivative being carried out in an inert aromatic hydrocarbon solvent solution of the reactants, said reaction being carried out by heating the solution of the reactants at a temperature of at least about 80° C.

2. In a process for producing a 7-dehydrosterol, the step which comprises reacting quinaldine with a cholesterol ether which has a double bond between the 5 carbon atom and the 6 carbon atom and which has a halogen atom attached to the 7 carbon atom with the reaction of the quinaldine with the halogenated sterol derivative being carried out in an inert aromatic hydrocarbon solvent solution of the reactants, said reaction being carried out by heating the solution of the reactants at temperature of at least about 80° C.

3. In a process for producing a 7-dehydrosterol, the step which comprises reacting quinaldine with a sterol ester which has a double bond between the 5 carbon atom and the 6 carbon atom and which has a halogen atom attached to the 7 carbon atom with the reaction of the quinaldine with the halogenated sterol derivative being carried out in an inert aromatic hydrocarbon solvent solution of the reactants, said reaction being carried out by heating the solution of the reactants at a temperature of at least about 80° C.

4. In a process for producing a 7-dehydrosterol, the step which comprises reacting quinaldine with an ester of cholesterol which has a double bond between the 5 carbon atom and the 6 carbon atom and which has a halogen atom attached to the 7 carbon atom with the reaction of the quinaldine with the halogenated sterol derivative being carried out in an inert aromatic hydrocarbon solvent solution of the reactants, said reaction being carried out by heating the solution of the reactants at a temperature of at least about 80° C.

5. In a process for producing a 7-dehydrosterol, the step which comprises reacting quinaldine with a benzoate ester of cholesterol which has a double bond between the 5 carbon atom and the 6 carbon atom and which has a halogen atom attached to the 7 carbon atom with the reaction of the quinaldine with the halogenated sterol derivative being carried out in an inert aromatic hydrocarbon solvent solution of the reactants, said reaction being carried out by heating the solution of the reactants at a temperature of at least about 80° C.

6. In a process for producing a 7-dehydrosterol, the step which comprises reacting quinaldine with an acetate ester of cholesterol which has a double bond between the 5 carbon atom and the 6 carbon atom and which has a halogen atom on the 7 carbon atom with the reaction of the quinaldine with the halogenated sterol derivative being carried out in an inert aromatic hydrocarbon solvent solution of the reactants, said reaction being carried out by heating the solution of the reactants at a temperature of a least about 80° C.

7. In a process for producing a 7-dehydrosterol, the step which comprises reacting quinaldine with 7-bromocholesteryl benzoate with the reaction of the quinaldine with the halogenated sterol derivative being carried out in an inert aromatic hydrocarbon solvent solution of the reactants, said reaction being carried out by heating the solution of the reactants at a temperature of at least about 80° C.

8. In a process for producing a 7-dehydrosterol, the step which comprises reacting quinaldine with 7-bromocholesteryl acetate with the reaction of the quinaldine with the halogenated sterol derivative being carried out in an inert aromatic hydrocarbon solvent solution of the reactants, said reaction being carried out by heating the solution of the reactants at a temperature of at least about 80° C.

9. In a process for producing a 7-dehydrosterol, the step which comprises reacting quinaldine with a cholesterol ether which has a double bond between the 5 carbon atom and the 6 carbon atom and which has a halogen atom attached to the 7 carbon atom with the reaction of the quinaldine with the halogenated cholesterol derivative being carried out in a benzene solution of the reactants, said reaction being carried out by heating the solution of the reactants at a temperature of at least about 80° C.

10. In a process for producing a 7-dehydrosterol, the step which comprises reacting quinaldine with a cholesterol ether which has a double bond between the 5 carbon atom and the 6 carbon atom and which has a halogen atom attached to the 7 carbon atom with the reaction of the quinaldine with the halogenated cholesterol derivative being carried out in a toluene solution of the reactants, said reaction being carried out by heating the solution of the reactants at a temperature of at least about 80° C.

11. In a process for producing a 7-dehydrosterol, the step which comprises reacting quinaldine with a cholesterol ether which has a double bond between the 5 carbon atom and the 6 carbon atom and which has a halogen atom attached to the 7 carbon atom with the reaction of the quinaldine with the halogenated cholesterol derivative being carried out in a xylene solution of the reactants, said reaction being carried out by heating the solution of the reactants at a temperature of at least about 80° C.

12. In a process for producing a 7-dehydrosterol, the step which comprises reacting quinaldine with an ester of cholesterol which has a double bond between the 5 carbon atom and the 6 carbon atom and which has a halogen atom attached to the 7 carbon atom with the reaction of the quinaldine with the halogenated cholesterol derivative being carried out in a benzene solution of the reactants, said reaction being carried out by heating the solution of the reactants at a temperature of at least about 80° C.

13. In a process for producing a 7-dehydrosterol, the step which comprises reacting quinaldine with an ester of cholesterol which has a double bond between the 5 carbon atom and the 6 carbon atom and which has a halogen atom attached to the 7 carbon atom with the reaction of the quinaldine with the halogenated cholesterol derivative being carried out in a toluene solution of the reactants, said reaction being carried out by heating the solution of the reactants at a temperature of at least about 80° C.

14. In a process for producing a 7-dehydrosterol, the step which comprises reacting quinaldine with an ester of cholesterol which has a double bond between the 5 carbon atom and the 6 carbon atom and which has a halogen atom attached to the 7 carbon atom with the reaction of the quinaldine with the halogenated cholesterol derivative being carried out in a xylene solution of the reactants, said reaction being carried out by heating the solution of the reactants at a temperature of at least about 80° C.

15. In a process for producing a 7-dehydrosterol, the step which comprises reacting quinaldine with 7-bromocholesteryl acetate with the reaction being carried out in a benzene solution of the reactants, said reaction being carried out by heating the solution of the reactants at a temperature of at least about 80° C.

16. In a process for producing a 7-dehydrosterol, the step which comprises reacting quinaldine with 7-bromocholesteryl benzoate with the reaction being carried out in a toluene solution of the reactants, said reaction being carried out by heating the solution of the reactants at a temperature of at least about 80° C.

17. In a process for producing a 7-dehydrosterol, the step which comprises reacting quinaldine with 7-bromocholesteryl benzoate with the reaction being carried out in a xylene solution of the reactants, said reaction being carried out by heating the solution of the reactants at a temperature of at least about 80° C.

KURT H. SCHAAF.

REFERENCES CITED

The following references are of record in the file of this patent:

UNITED STATES PATENTS

| Number | Name | Date |
|---|---|---|
| 2,023,075 | Harris | Dec. 3, 1935 |
| 2,255,815 | Rosenberg | Sept. 16, 1941 |
| 2,341,733 | Meuly | Feb. 15, 1944 |
| 2,441,091 | Van der Vliet et al. | May 4, 1948 |
| 2,441,560 | Butenandt | May 18, 1948 |
| 2,476,424 | Lowenbein | July 19, 1948 |

FOREIGN PATENTS

| Number | Country | Date |
|---|---|---|
| 500,353 | Great Britain | Jan. 31, 1939 |